No. 680,348. Patented Aug. 13, 1901.
J. P. NOLAN.
PUZZLE.
(Application filed May 22, 1899.)
(No Model.)
Fig.1.
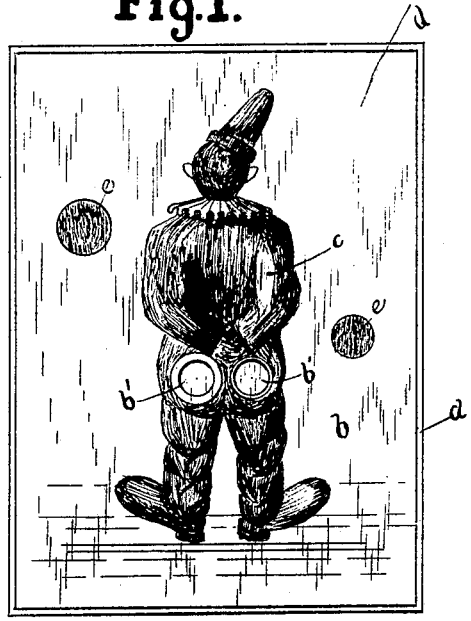
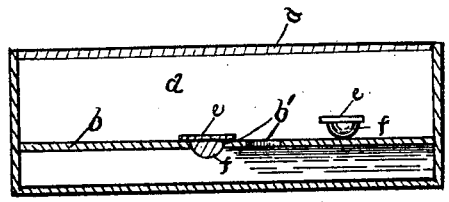
Fig.2.
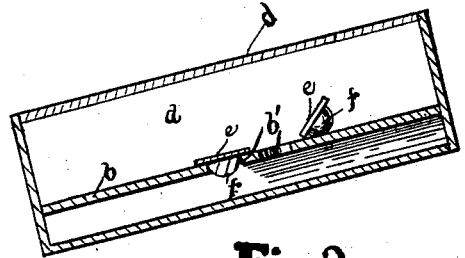
Fig.3.
James P Nolan
Inventor
Witnesses

United States Patent Office.

JAMES P. NOLAN, OF MIDDLETOWN, CONNECTICUT.

PUZZLE.

SPECIFICATION forming part of Letters Patent No. 680,348, dated August 13, 1901.

Application filed May 22, 1899. Serial No. 717,840. (No model.)

*To all whom it may concern:*

Be it known that I, JAMES P. NOLAN, a citizen of the United States, residing at Middletown, in the county of Middlesex, State of Connecticut, have invented certain new and useful Improvements in Puzzles; and I do hereby declare the following to be a full, clear, and exact description of the invention, such as will enable others skilled in the art to which it appertains to make and use the same.

My invention relates to puzzles, and has for its object to provide a device of this nature which in its operation will require a careful manipulation to properly move its parts and which will be amusing and entertaining to the manipulator.

In practice my invention consists of a box having a false bottom having thereon the picture of a person having on trousers with holes in the seat. A pair of small disks are provided, the diameters of which are greater than those of the holes, and secured to the under sides of these disks are hemispheres, whereby by tilting the box and agitating it the disks may be caused to move over the surface of the false bottom and the hemispheres may enter the holes and thus hold the disks to cover them.

In the drawings forming a portion of this specification, and in which like letters of reference indicate similar parts in the several views, Figure 1 is a plan view of my puzzle. Fig. 2 is a vertical transverse section taken through the center of the openings in the false bottom, with one of the hemispheres seated in an opening; and Fig. 3 is a similar view, but showing the box in a tilted position.

Referring now to the drawings, in operating in accordance with my invention I form a box $a$, having a false bottom $b$, in which are formed one or more openings $b'$, as shown, and which openings may represent holes in the trousers of a figure $c$, printed or otherwise represented upon the upper surface of the false bottom. The box $a$ is provided with a glass cover $d$ to prevent the total displacement of a plurality of disks $e$, corresponding in number to the openings $b$ and each having a diameter greater than that of the openings. Attached to the under side of each disk $e$ is a hemisphere $f$, whereby when the box $a$ is tilted, as shown in Fig. 3 of the drawings, the edges of the disk and hemisphere will form a bearing, and when rocked the element will move with a gyratory action over the surface of the box-bottom and by careful manipulation the hemispheres may be caused to fall into the openings and hold their disks to cover them. If desired, the openings may be of different sizes to fit the hemispheres, as shown, and it will be readily understood that I may use as many openings and disks as I may wish and may make them of any desired material and may, furthermore, place any desired representation upon the false bottom without departing in any way from the spirit of my invention.

Having thus described my invention, what I claim is—

A puzzle comprising a base having circular openings of different diameters and movable bodies corresponding in number to the openings, each of the said bodies being adapted to slide and roll upon the base and consisting of a hemisphere having a diameter equal to that of an opening and a disk fixed upon the flat side of the hemisphere, and concentric therewith, said disk projecting beyond the periphery of the hemisphere whereby the hemisphere and the disk may each have a single point bearing upon the base and may move thereover in a zigzag course, and whereby it will be necessary to slide the bodies upon the base to move them in a straight line.

In testimony whereof I affix my signature in presence of two witnesses.

JAMES P. NOLAN.

Witnesses:
 BELL A. SILVA,
 CHARLES A. PELTON.